US008023595B2

United States Patent
Xu et al.

(10) Patent No.: US 8,023,595 B2
(45) Date of Patent: Sep. 20, 2011

(54) METHOD AND SYSTEM OF TIME-OF-ARRIVAL ESTIMATION FOR ULTRA WIDEBAND MULTI-BAND ORTHOGONAL FREQUENCY DIVISION MULTIPLEXING SIGNALS

(75) Inventors: Huilin Xu, Gainesville, FL (US); Chia-Chin Chong, Santa Clara, CA (US); Ismail Guvenc, Santa Clara, CA (US)

(73) Assignee: NTT DOCOMO, Inc., Tokyo (JP)

( * ) Notice: Subject to any disclaimer, the term of this patent is extended or adjusted under 35 U.S.C. 154(b) by 580 days.

(21) Appl. No.: 12/176,958

(22) Filed: Jul. 21, 2008

(65) Prior Publication Data

US 2009/0046792 A1 Feb. 19, 2009

Related U.S. Application Data

(60) Provisional application No. 60/956,472, filed on Aug. 17, 2007.

(51) Int. Cl.
*H04L 27/06* (2006.01)

(52) U.S. Cl. ........ 375/340; 375/130; 375/150; 375/231; 375/148; 375/316; 375/260; 375/343

(58) Field of Classification Search .............. 375/340, 375/130, 148, 150, 231, 316, 260, 343
See application file for complete search history.

(56) References Cited

U.S. PATENT DOCUMENTS

| 7,299,043 | B2 * | 11/2007 | Mouna-Kingue et al. | 455/434 |
| 7,450,069 | B2 * | 11/2008 | Heidari-Bateni et al. | 342/458 |
| 2007/0025456 | A1 * | 2/2007 | McCrady | 375/260 |

OTHER PUBLICATIONS

ECMA-368: high rate ultra wideband PHY and MAC standard, 1$^{st}$ edition, Dec. 2005.
E. G. Larsson, Guoqing Liu, Jian Li and G. B. Giannakis, "Joint symbol timing and channel estimation for OFDM based WLANs," *IEEE Communications Letters*, vol. 5, No. 8, pp. 325-327, Aug. 2001.
T. M. Schmidl and D. C. Cox, "Robust Frequency and Timing Synchronization for OFDM," *IEEE Transactions on Communications*, vol. 45, No. 12, pp. 1613-1621, Dec. 1997.
H. Minn, V. K. Bhargava, and K. B. Letaief, "A Robust Timing and Frequency Synchronization for OFDM Systems," *IEEE Transactions on Wireless Communications*, vol. 2, No. 4, pp. 822-839, Jul. 2003.
Wei Chee Lim, B. Kannan and T.T. Tjhung, "Joint channel estimation and OFDM synchronization in multipath fading," *ICC 2004*, vol. 2, pp. 983-987, Jun. 20-24, 2004.
C.R. Berger, Z. Tian, P. Willett and S. Zhou, "Precise Timing for Multiband OFDM in a UWB System," *ICUWB 2006*, pp. 269-274, Sep. 2006.

(Continued)

*Primary Examiner* — Dhaval Patel
(74) *Attorney, Agent, or Firm* — Haynes & Boone, LLP

(57) ABSTRACT

A time-of-arrival (TOA) estimation method for multi-band orthogonal frequency division multiplexing (MB-OFDM) signals uses a simple equally-spaced channel model to recover the impulse response of the wireless channel, and locates the delay of the first channel path by minimizing the energy leakage from the first channel path. The TOA is estimated based on the delay. Such a method does not require channel information for TOA estimation at the receiver and does not require modification of the receiver structure. The method also avoids a sub-optimal solution known to occur in maximum likelihood (ML) estimation.

9 Claims, 3 Drawing Sheets

OTHER PUBLICATIONS

E. Saberinia and A.H. Tewfik, "Enhanced localization in wireless personal area networks," *IEEE Globecom '04*, vol. 4, pp. 2429-2434, Nov. 29-Dec. 3, 2004.

Y. G. Li, A. F. Molisch and J. Zhang, "Practical approaches to channel estimation and interference suppression for OFDM-based UWB communications," *IEEE Trans. on Wireless Communications*, vol. 5, No. 9, pp. 2317-2320, Sep. 2006.

B. H. Fleury, M. Tschudin, R. Heddergou, D. Dahlhaus and K. I. Pedersen, "Channel parameters estimation in mobile radio environments using SAGE algorithm," *IEEE J. Select. Areas Commun.*, vol. 17, No. 3, pp. 434-449, Mar. 1999.

S. Zhang and J. Zhu, "SAGE based channel estimation and delay tracking scheme in OFDM systems," *IEEE VTC 2005-Spring*, vol. 2, pp. 788-791, May 30-Jun. 1, 2005.

I. Maravic and M. Vetterli, "Sampling and reconstruction of signals with finite rate of innovation in the presence of noise," *IEEE Trans. Signal Processing*, vol. 53, No. 8, part 1, pp. 2788-2805, Aug. 2005.

Simeone, Y. Bar-Ness and U. Spagnolini, "Pilot-based channel estimation for OFDM systems by tracking the delay subspace", *IEEE Trans. on Wireless Communications*, vol. 3, No. 1, pp. 315-325, Jan. 2004.

H. Minn, Dong In Kim and V.K. Bhargava, "A reduced complexity channel estimation for OFDM systems with transmit diversity in mobile wireless channels," *IEEE Trans. on Communications*, vol. 50, No. 5, pp. 799-807, May 2002.

A. L. Swindlehurst, "Time delay and spatial signature estimation using known asynchronous signals," *IEEE Trans. Signal Processing*, vol. 46, pp. 449-462, Feb. 1998.

J. R. Foerster, "Channel Modeling Subcommittee Report Final," IEEE 802.15-02/490r1, Feb. 2003.

* cited by examiner

METHOD AND SYSTEM OF TIME-OF-ARRIVAL ESTIMATION FOR ULTRA WIDEBAND MULTI-BAND ORTHOGONAL FREQUENCY DIVISION MULTIPLEXING SIGNALS

CROSS-REFERENCE TO RELATED APPLICATIONS

The present application relates to and claims priority of U.S. provisional patent application, Ser. No., 60/956,472, entitled "Method and System of Time-of-Arrival Estimation for Ultra Wideband Multi-Band Orthogonal Frequency Division Multiplexing Signals," filed on Aug. 17, 2007. The disclosure of the copending provisional patent application is hereby incorporated by reference in its entirety.

FIELD OF THE INVENTION

1. Field of the Invention

The present invention relates to data communication. In particular, the present invention relates to determining channel characteristics of wireless data communication, based on a time-of-arrival (TOA) estimation.

2. Discussion of the Related Art

Orthogonal frequency division multiplexing (OFDM) is a digital multi-carrier modulation technique, which uses a large number of closely-spaced orthogonal carriers. These carriers are also sometimes referred to as "subcarriers" or "subchannels". OFDM splits a high-speed data stream into multiple lower-speed data streams each transmitted on one of these subcarriers. The digital multi-carrier modulation and demodulation are carried out in the baseband using inverse fast Fourier transform (IFFT) and fast Fourier transform (FFT) techniques. In addition, multi-band OFDM (MB-OFDM) combines the OFDM technique with a frequency hopping technique. At the transmitter, OFDM symbols are generated and transmitted on different frequency bands according to a frequency hopping pattern. MB-OFDM has been adopted as the high data-rate physical layer technique for ultra wideband (UWB) communications (See, e.g., ECMA-368: High Rate Ultra Wideband PHY and MAC standard," $1^{st}$ edition, December 2005.)

Various techniques have been proposed to perform TOA estimation in OFDM and MB-OFDM based wireless communication systems. In many of these techniques, a two-step estimation procedure is followed. In the first step of the two-step estimation procedure, the channel impulse response (CIR) is recovered using a channel estimation algorithm. In the second step, the estimated channel tap that corresponds to the first arriving path in the estimated channel is selected and its delay is used as a TOA estimate.

In one example, in the article "Joint Symbol Timing and Channel Estimation for OFDM based WLANs" ("Larsson"), by E. G. Larsson, Guoqing Liu, Jian Li and G. B. Giannakis, published in *IEEE Communications Letters*, vol. 5, no 8, pp. 325-327, August 2001, the authors disclose a joint estimation of the symbol timing, the channel length and the CIR of a discrete time wireless channel with OFDM signals, based on maximum-likelihood (ML) principles and the generalized Akaike information (GAI) criterion. In particular, the ML channel estimation is carried out using the initial assumption of the channel (maximum excess) delay and a channel order (i.e., the number of multipath components). The channel delay and the channel order are refined so as to maximize the GAI. ML estimation and GAI maximization are iteratively performed until the algorithm converges. The TOA of the channel is estimated from the delay of the first estimated channel path. Simulations show that this algorithm can achieve a satisfactory performance.

In the articles (a) "Robust Frequency and Timing Synchronization for OFDM," ("Schmidl") by T. M. Schmidl and D. C. Cox, published in *IEEE Transactions on Communications*, vol. 45, no. 12, pp. 1613-1621, December 1997 and (b) "A Robust Timing and Frequency Synchronization for OFDM Systems" ("Minn"), by H. Minn, V. K. Bhargava, and K. B. Letaief, published in *IEEE Transactions on Wireless Communications*, vol. 2, no. 4, pp. 822-839, July 2003, the authors disclose TOA estimation techniques for use with OFDM signals by correlating the consecutive received signal segments. For example, in Schmidl, the OFDM signals are detected based on a training sequence of two symbols, in which the first half of the training symbol is identical to the second half. Under that method, a number L of complex samples are provided in one-half of the first training symbol. A window of twice the number (i.e., 2L) of samples slide along in time to calculate the correlation function between the two consecutive L-sample segments. The correlation function reaches a plateau which has a length equal to the length of the guard interval, less the length of the CIR. The TOA can be detected by searching the edge of the plateau. In Minn, different training symbol patterns are investigated to improve the TOA estimation performance. The optimum patterns are those having the narrowest plateau. Using these patterns, Minn's receiver achieves a much smaller timing offset than Schmidl.

In the article "Joint Channel Estimation and OFDM Synchronization in Multipath Fading" ("Lim"), by Wei Chee Lim, B. Kannan and T. T. Tjhung, published in *ICC* 2004, vol. 2, pp. 983-987, 20-24 Jun. 2004, the authors apply the RAKE type receiver structure to a joint channel and TOA estimation. Under their method, a known training sequence is transmitted at the transmitter. On the receiver side, the received signal is sampled and the multipath energy is captured by the RAKE filter bank. In that receiver, each RAKE finger in the filter bank is a matched filter that is matched to one multipath component (MPC) of the wireless channel. According to the number of RAKE fingers N, the delay of each finger is adjusted until the sum of the captured energy is maximized. The delay of the finger with the smallest delay is taken as an estimate of the channel TOA.

In the article "Precise Timing for Multiband OFDM in a UWB System" ("Berger"), by C. R. Berger, Z. Tian, P. Willett and S. Zhou, published in *ICUWB* 2006, pp. 269-274, September 2006, a method is disclosed which is based on an assumption that the number of arriving paths L is known at the receiver. Under that method, the channel coefficients are assumed to be independent and identically distributed ("i.i.d."), i.e., the probability distribution function for the channel coefficients is described by a complex Gaussian distribution with a zero mean and a known variance. Under these assumptions, the TOA of the channel can be estimated according to the ML criterion. Similarly, in the article "Enhanced Localization in Wireless Personal Area Networks" ("Saberinia"), by E. Saberinia and A. H. Tewfik, published in *IEEE GLOBECOM '04*, vol. 4, pp. 2429-2434, 29 Nov.-3 Dec. 2004, the i.i.d. constraint on the channel coefficients is relaxed. Under that method, the received signals of all bands are first coherently combined, and the delay of the first channel path is then estimated using the ML criterion. Both the theoretical analysis and simulation results demonstrate a performance improvement due to the coherent combining.

In the article "Practical Approaches to Channel Estimation and Interference Suppression for OFDM-based UWB Communications" ("Li"), by Y. G Li, A. F. Molisch and J. Zhang, published in *IEEE Transactions on Wireless Communications*, vol. 5, no. 9, pp. 2317-2320, September 2006, the authors disclose a channel estimation approach for OFDM-based UWB systems. Under their approach, the channel delay profile is assumed to be known at the receiver under certain circumstances. In that method, a rough discrete Fourier transform (DFT) based channel estimation is first carried out to estimate the CIR. Then, using the channel delay profile, noise is suppressed in the CIR estimate. This channel estimation can be further extended to estimate the TOA for OFDM-based UWB signals.

Most of the TOA estimation algorithms discussed above assume that the wireless channel is described by a discrete time sampled-spaced model. In this model, the interval between adjacent paths is an integer multiple of the sampling interval of the receiver. This assumption facilitates both channel estimation and TOA estimation, but it is not realistic. Furthermore, the TOA estimation resolution is constrained by the sampling interval of the receiver. The channel estimation algorithm proposed in Li above can be extended to estimate the TOA for MB-OFDM systems. Simulation results show that Li's approach can effectively suppress noise. However, the required channel delay profile information may not always be available at the receiver in any given environment.

In both the articles (a) "Channel Parameter Estimation in Mobile Radio Environments using the SAGE Algorithm" ("Fleury"), by B. H. Fleury, M. Tschudin, R. Heddergott, D. Dahlhaus and K. I. Pedersen, published in *IEEE J. Select. Areas Commun.*, vol. 17, no. 3, pp. 434-450, March 1999, and (b) "SAGE based Channel Estimation and Delay Tracking Scheme in OFDM Systems" ("Zhang"), by S. Zhang and J. Zhu, published in *IEEE VTC* 2005-*Spring*, vol. 2, pp. 788-791, 30 May-1 June 2005, the authors discuss the joint ML channel estimation and TOA estimation problem in a realistic channel model. The authors recognize that, even though expectation maximization (EM) is an effective iterative algorithm to solve the ML estimation problem, the EM algorithm is not applicable to estimating rich multipath channels in practice because of its slow convergence rate. Therefore, the authors adopt a space-alternating generalized EM (SAGE) algorithm to provide a joint channel estimation and TOA estimation, which converges much faster than the EM algorithm. Unlike the EM algorithm that estimates parameters in parallel, SAGE updates the values of these parameters in a serial manner. The likelihood increases after each iteration. The estimation algorithm terminates when the increment of likelihood between two successive iterations becomes less than a threshold.

The SAGE algorithm according to either Fleury or Zhang makes the solution of the ML estimation problem tractable because of its fast convergence rate. However, when the number of the unknown parameters is very large, the SAGE algorithm may converge to a sub-optimum state. When that occurs (a condition called a "local maximum"), the individual path may not be accurately estimated, even though the over all likelihood is maximized.

In the article "Sampling and Reconstruction of Signals with Finite Rate of Innovation in the Presence of Noise," by I. Maravic and M. Vetterli, published in *IEEE Transactions on Signal Processing*, vol. 53, no. 8, part 1, pp. 2788-2805, August 2005, the authors apply a subspace-based approach to a TOA estimation problem in a realistic channel scenario with continuously varying multipath delays. Under their method, a Hankel matrix is constructed with the observed channel Fourier transform coefficients. The singular values and the singular vectors of this Hankel matrix are calculated using the singular value decomposition (SVD) technique. Each singular value and vector pair corresponds to one MPC of the channel. Because the channel is of order N, the multipath delays and amplitudes can be estimated by further processing the N singular vectors, which correspond to the N largest singular values (i.e., the N strongest signal subspaces). Using this method, a subspace-based approach also can effectively suppress noise. After channel estimation, TOA can be estimated using the smallest delay of the estimated channel paths. As compared to the SAGE algorithm, the subspace-based approach has the advantage of low computational complexity, but does not perform robustly in multipath-rich environments.

The subspace-based approach can effectively suppress noise only when the strongest singular values are selected as the principal singular vectors. The subspace-based approach does not perform well for TOA estimation in multipath-rich channels.

SUMMARY

According to one embodiment of the invention, a two-step TOA estimation algorithm applicable to MB-OFDM UWB signals is provided. In the first step, the CIR of a wireless channel can be recovered from a simple equally-spaced model, using a least squares (LS) method. The inter-tap interval under this model is set to the inverse of the bandwidth of the received signal, which is known as the system resolution and is the smallest inter-tap interval that guarantees the problem solvable[1]. Using MB-OFDM signals, the system resolution of such a model can be made much smaller than the receiver sampling interval. In the second step, an algorithm of the present invention adjusts the delay of the first tap of the model to minimize the energy leakage from the first path of the channel. A differential change detector can find the tap of the model corresponding to the first path of the channel, which provides the estimate of the channel TOA.

[1] An equally-spaced model is described, for example, in the article "Pilot-based Channel Estimation for OFDM Systems by Tracking the Delay Subspace", by O. Simeone, Y. Bar-Ness and U. Spagnolini, published in *IEEE Transactions on Wireless Communications*, vol. 3, no. 1, pp. 315-325, January 2004.

One advantage of the present invention over the prior art is its ability to realistically model a channel. In the channel modeled under the present invention, the delay of an individual path is continuously varying. Therefore, the resolution of the TOA estimation result can be much better than the sampling interval of the receiver. The sampling interval of the receiver is usually regarded as the achievable resolution, when the channel is assumed to be discrete time sampled-spaced as discussed in the ECMA-368, Larsson, Schmidl, Minn., Lim, Berger, and Saberinia references above.

Another advantage of the present invention is achieved because a method of the present invention does not require any channel information at the receiver, such as the channel delay profile information required by Li. Therefore, the TOA estimation of the present invention is applicable under any environment.

Further, a method of the present invention is simpler than ML-based techniques (e.g., a SAGE-based TOA estimation algorithm). The present invention, for example, may recover the CIR using a simple equally spaced model. When the tap interval is set to the system resolution, only one free parameter needs to be optimized: the delay of the first tap. Furthermore, this parameter is optimized by varying its value within the range of $[0, T_p]$ which is a much smaller search range than the search range of each path delay in SAGE-based approach. In the SAGE-based approach, to maximize the likelihood, the delay of each path is varied from 0 to the maximum delay of the channel. Therefore, the computation complexity in a TOA estimation algorithm of the present invention is less than that of the SAGE-based methods, such as those discussed in Fleury and Zhang.

According to one method of the present invention, multi-band signals are coherently combined. Therefore, a method of the present invention can achieve a resolution higher than the resolution achievable by a non-coherent method, such as that described in Berger. In Berger, the achievable resolution of TOA estimation is the sampling interval of the receiver. In contrast, according to one method of the present invention, the achievable resolution of the TOA estimation is the inverse of the signal bandwidth, which is a much smaller range than the sampling interval of the receiver.

Another advantage according to the present invention is achieved because the TOA estimation algorithm directly estimates the delay of the first arriving path by minimizing the energy leakage from the first path. A method of the present invention compares favorably to the SAGE-based TOA estimation method, which is known to converge to a suboptimal solution. Furthermore, the subspace-based method is known to be not as robust as the SAGE-based method in multipath-rich environments. Therefore, the TOA estimation method of the present invention can outperform both SAGE-based and subspace-based methods.

The present invention is better understood upon consideration of the detailed description below, in view of the accompanying drawings.

[2] See, for example, "Channel Modeling Subcommittee Report Final," by J. R. Foerster, published in IEEE 802.15-02/490r1, February 2003.

Figure 5:
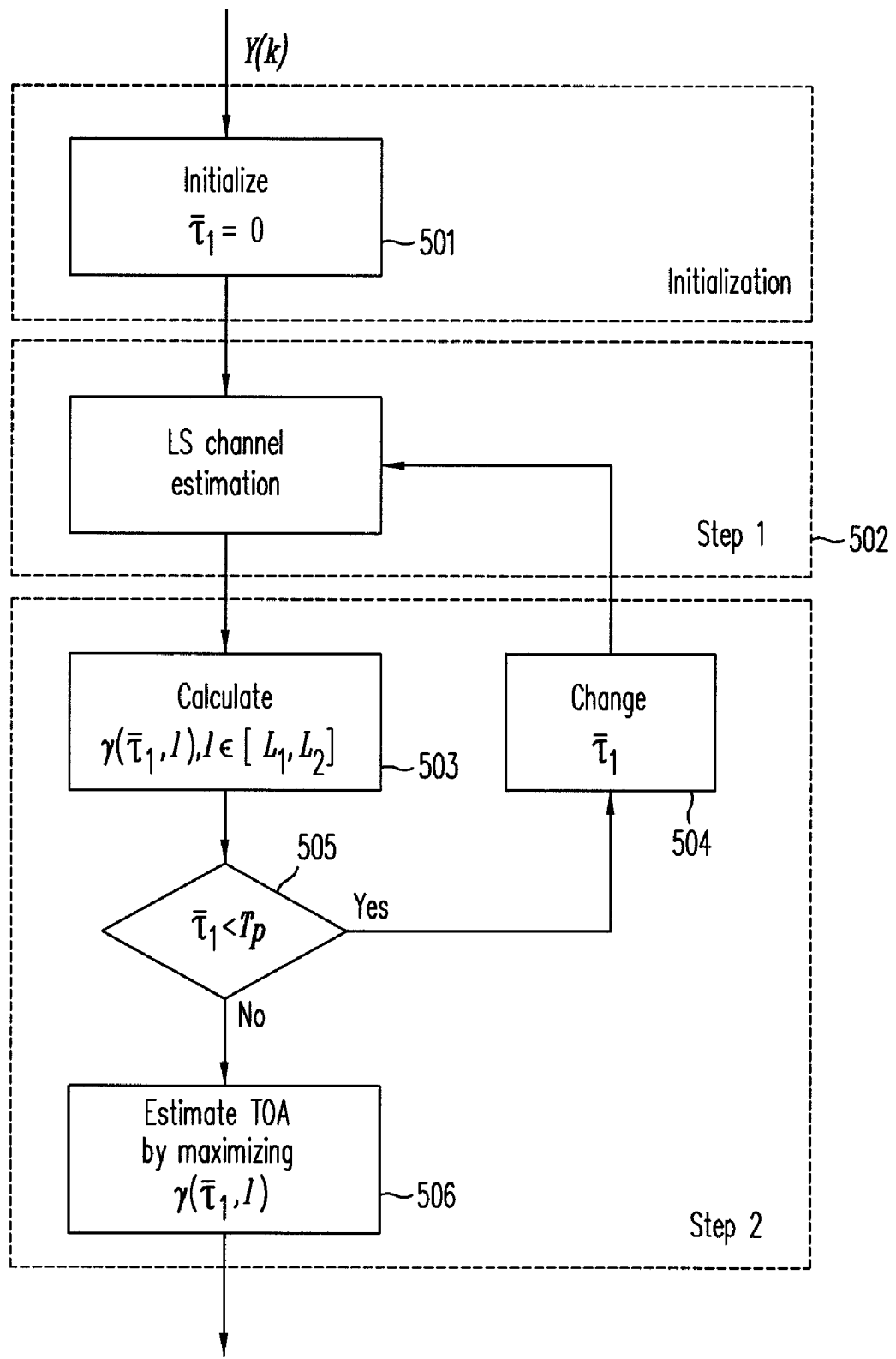

FIG. 5 is a flow chart summarizing a method of the TOA estimation, according to one embodiment of the present invention.

DETAILED DESCRIPTION OF THE PREFERRED EMBODIMENTS

Figure 1:
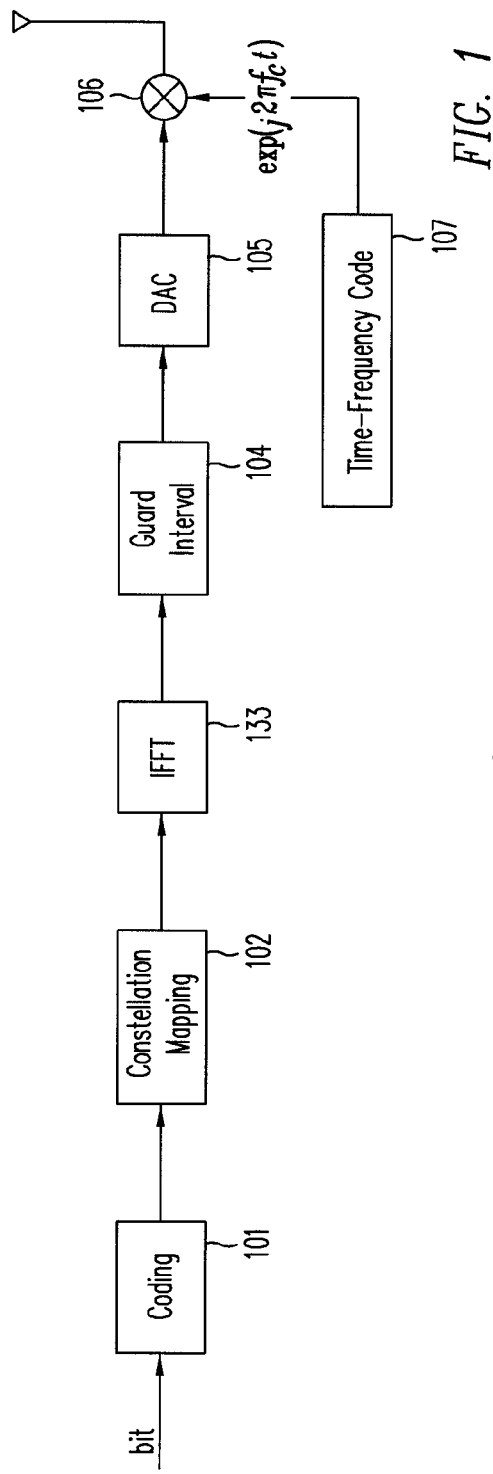
FIG. 1 shows the architecture of a MB-OFDM transmitter, according to one embodiment of the present invention.

FIG. 1 shows the architecture of a MB-OFDM transmitter. As shown in FIG. 1, information bits are encoded (step 101), mapped to a constellation for symbol encoding (step 102), and multi-carrier modulated at baseband using an IFFT operation (step 103). The basic OFDM symbols are appended with guard intervals (GI, step 104). The processed symbols are then converted from digital to an analog form (D-A, step 105). The baseband signals are then carrier-modulated on one of the B frequency bands according to a frequency hopping pattern (step 106) under control of time frequency code generator 107.

The OFDM symbols are transmitted on B frequency bands, $[N_1, \omega_0, M_1\omega_0], \ldots, [N_{B-1}\omega_0, M_{B-1}\omega_0]$ and $[N_B\omega_0, M_B\omega_0]$ where $\omega_0$ is the smallest spacing between subcarriers, and where $N_b$, $M_b$ are integers, for $b=1, \ldots, B$, so that a total of N subcarriers are formed in the B frequency bands, where N is given by:

$$N = \sum_{b=1}^{B} M_b - \sum_{b=1}^{B} N_b + B. \quad (1)$$

Symbols $\omega_k$, $k \in [1, N]$ can be used to further denote the set of subcarriers. In one signal transmission for TOA estimation, pilot data $S(k)$, $k \in [1, N]$, known to the receiver, are transmitted on these N subcarriers.

Figure 2:
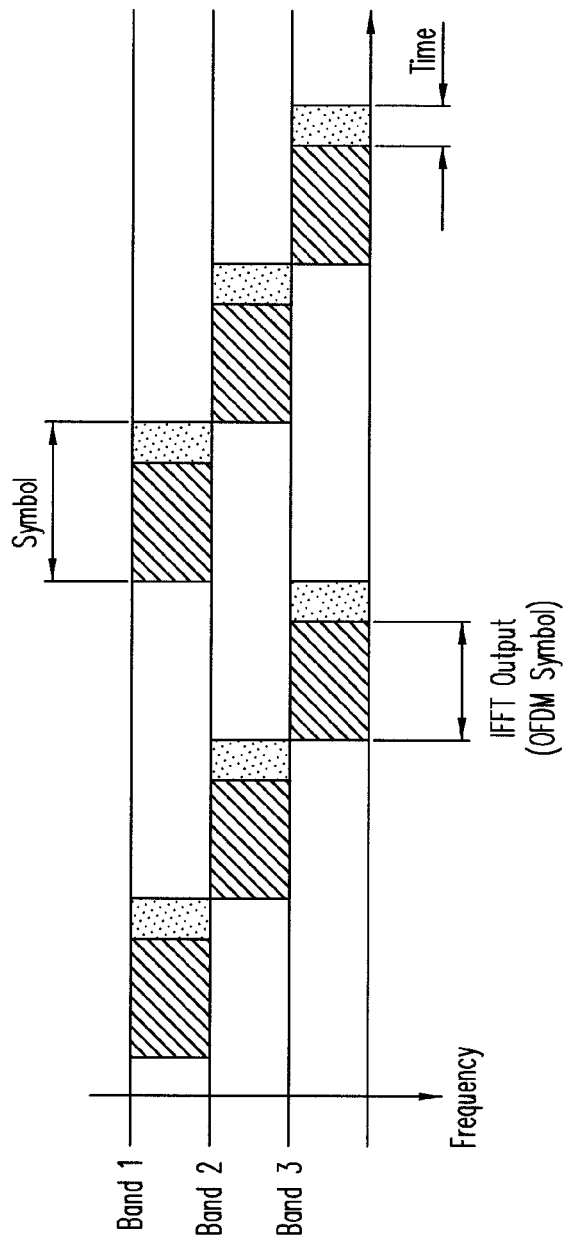
FIG. 2 illustrates an example of the transmitted radio frequency (RF) signals for the MB-OFDM system of FIG. 1.

FIG. 2 illustrates an example of the transmitted radio frequency (RF) signals for a MB-OFDM system. As illustrated in FIG. 2, three frequency bands are used to transmit OFDM signals. The frequency hopping pattern (i.e., which frequency band is to be used in the next symbol duration) is assigned by a time frequency code generator (e.g., time frequency code generator 107 of FIG. 1).

The wireless channel may be described by the following multipath model:

$$h(t) = \sum_{l=1}^{L} h_l \delta(t - \tau_l), \quad (2)$$

where $\{h_l\}_{l=1}^{L}$, and $\{\tau_l\}_{l=1}^{L}$ are the amplitudes and delays of the L multipath components, respectively. The delay of the first channel arriving path $\tau_1$ is defined as the TOA of the channel. For a TOA estimation, an objective according to the present invention estimates the value of $\tau_1$ without modifying the OFDM receiver structure.

Figure 3:
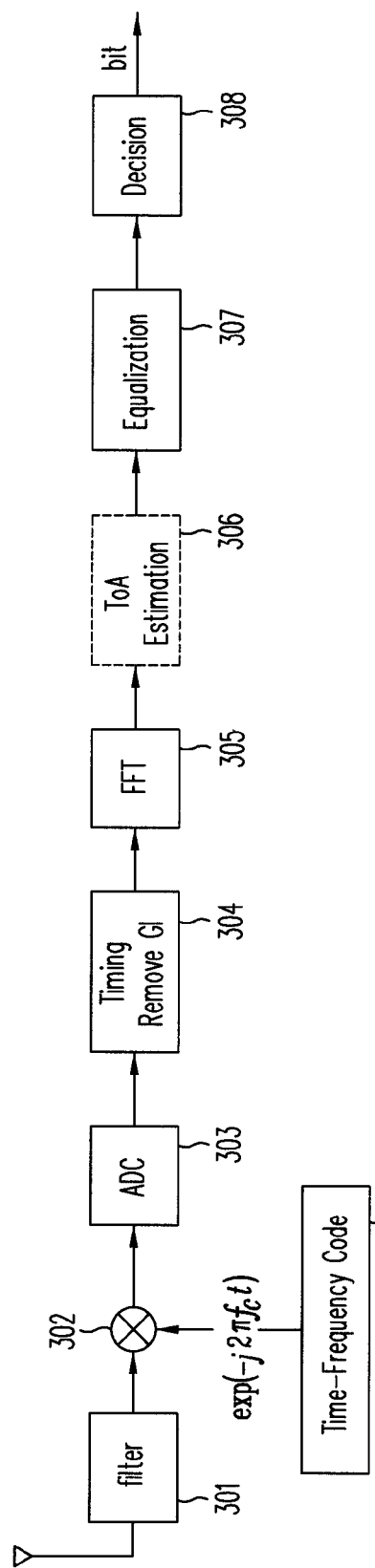
FIG. 3 illustrates a receiver architecture, in accordance with one embodiment of the present invention.

FIG. 3 illustrates a receiver architecture, in accordance with one embodiment of the present invention. As shown in FIG. 3, the received waveform is filtered (step 301) and carrier-demodulated (step 302), according to the frequency hopping pattern and converted from analog form to digital baseband discrete time signals (A-D, step 303). An initial coarse timing step is performed to recognize the rough start of each symbol and, accordingly, the GI associated with the symbol is removed (step 304). At step 305, the FFT operation is carried out to multi-carrier demodulate the baseband signal. Given N pilot signals $\{S(k)\}_{k=1}^{N}$ transmitted, the received signals on the pilot subcarriers can be represented by:

$$R(k) = H(k) \cdot S(k) + W(k), k \in [1, N] \quad (3)$$

where $W(k)$ is the frequency domain additive noise and $H(k)$ is the channel Fourier transform coefficient on the kth pilot subcarrier which can be expressed as follows $$H(k) = \sum_{l=1}^{L} h_l \exp(-j\omega_k \tau_l). \quad (4)$$

Assuming the pilot signal $S(k)$ is amplitude normalized, the channel in the LS method is obtained by multiplying $H(k)$ with the conjugate of $S(k)$ $$Y(k) = R(k) \cdot S^*(k) = H(k) + N(k), \quad (5)$$

where $(\cdot)^*$ denotes the conjugate of a complex number, and $N(k) = W(k) \cdot S^*(k)$, from the noise term $W(k)$ of equation (3).

According to one embodiment of the present invention, the TOA estimation can be carried out in a two-step procedure. In the first step, the CIR is recovered using the frequency domain LS channel estimates $\{Y(k)\}k=1$. In the second step, the delay of the tap which corresponds to the first channel arriving path provides the TOA estimate.

The present invention provides a simple model for reconstructing the time domain channel, using $L_M$ equally spaced taps $$\overline{h}(t) = \sum_{l=1}^{L_M} \overline{h}_l \delta(t - \overline{\tau}_l), \quad (6)$$

where $\overline{h}_l$ and $\overline{\tau}_l = (l-1)T_p + \overline{\tau}_1$, denote the amplitude and the delay of the lth tap, respectively. The tap interval $T_p$ is set to the inverse of the bandwidth of the received signal, which is sometimes called the system resolution. It has been demonstrated that, when $T_p$ is smaller than the system resolution, the problem of estimating h(t) becomes unsolvable.[3] Therefore, the tap interval $T_P$ cannot be smaller than the system resolution. Thus, when multi-band signals are used for TOA estimation, the system resolution can be much better than the sampling interval of the receiver, which is the inverse of the bandwidth of a single band. The tap number $L_M$ should be large enough, so that $L_M T_p$ is no smaller than the length of the real channel h(t).

[3] See, for example, the article "Time Delay and Spatial Signature Estimation Using Known Asynchronous Signals," by A. L. Swindlehurst, published in *IEEE Transactions on Signal Processing*, vol. 46, pp. 449-462, February 1998.

The CIR can then be estimated by approximating the frequency channel estimates [Y(1), ... Y(N)] as the Fourier transform coefficients of the model $\overline{h}(t)$ on pilot carriers $\omega_k$, $k \in [1, N]$ $$Y(k) = \sum_{l=1}^{L_M} \overline{h}_l \exp(-j\omega_k \overline{\tau}_l). \quad (7)$$

In matrix form the equation above can be expressed as:

$$y = F\overline{h}, \quad (8)$$

where $\overline{h} = [\overline{h}_1, \overline{h}_2, \ldots, \overline{h}_{L_M}]$ is the vector of the amplitudes of the model,
$y = [Y(1), Y(2), \ldots Y(N)]$ is the vector of the frequency domain signals, and F is an $N \times L_M$ matrix with the entry on the kth row and the lth column given by
$\exp(-j\omega_k \overline{\tau}_l)$, $k \in [1, N]$, $l \in [1, L_M]$. y can be solved using the LS method:

$$\overline{h} = (F^H F)^{-1} F^H y, \quad (9)$$

where $(g)^H$ denotes the conjugate transpose operation on a matrix g. In fact, the above equation (9) coherently combines the channel information from multiple frequency bands when multi-band signals are used (See, e.g., Saberinia, above).

Figure 4:
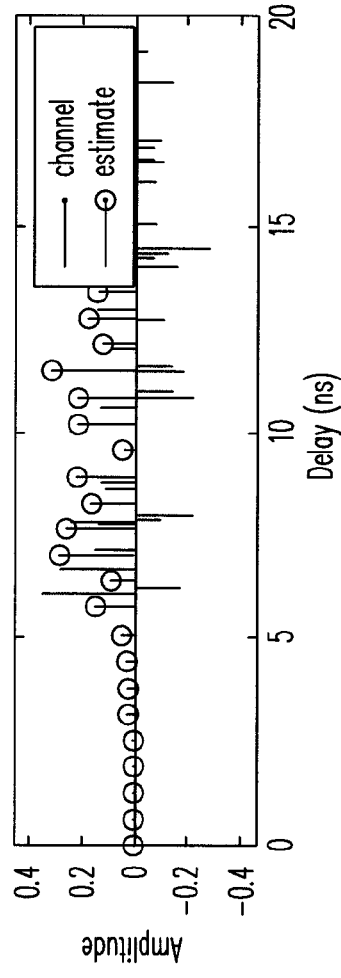
FIG. 4 shows the amplitudes of one realization of the IEEE 802.15.3a line-of-sight (LOS) channel[2] and the absolute amplitude of the channel estimates of this channel realization, respectively.
Figure 4:
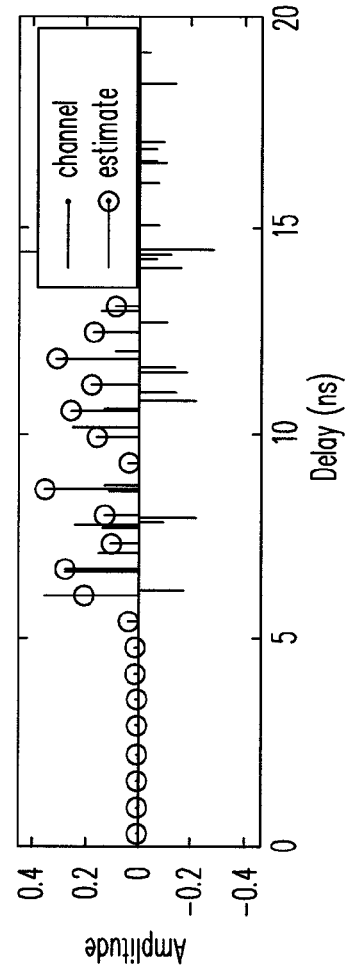

The above LS solution may induce energy leakage, such as discussed in the article "A Reduced Complexity Channel Estimation for OFDM Systems with Transmit Diversity in Mobile Wireless Channels," by H. Minn, D. I. Kim and V. K. Bhargava, published in *IEEE Transactions on Communications*, vol. 50, no. 5, pp. 799-807, May 2002. Under that model, the energy of the lth arriving path in the channel h(t) is dispersed to all taps in the model $\overline{h}(t)$. The energy leakage vanishes, when this path is exactly sampled by one tap of the model. FIG. 4 shows the energy leakage for the LS channel estimation with different $\overline{\tau}_1$.

FIG. 4 shows both the amplitudes of one realization of the IEEE 802.15.3a line-of-sight (LOS) channel[4] (represented by the "channel" samples) and the absolute amplitude of the channel estimates of this channel realization (represented by the "estimate" samples), respectively. As shown in the upper chart in FIG. 4, the recovered CIR has a strong energy leakage from the first path, because no tap is close to the first signal arrival of the channel. In the lower chart of FIG. 4, however, the energy leakage is sufficiently mitigated, when one tap in the model becomes very close to the first channel path. As a result, there is a sharp change of amplitude in the channel estimates at delay $\tau_1$.

[4] See, for example, "Channel Modeling Subcommittee Report Final," by J. R. Foerster, published in IEEE 802.15-02/490r1, February 2003.

The sharp change and its corresponding delay in the recovered CIR may be found according to the following criterion:
1. Set the initial value of the delay of the channel model to $\overline{\tau}_1 = 0$.
2. Fix $\overline{\tau}_1 = 0$, vary l from $L_1$ to $L_2$ until $\gamma(\overline{\tau}_1, l)$ is maximized $$\gamma(\overline{\tau}_1, l) = \frac{|\overline{h}_l|^2}{\frac{1}{M} \sum_{n=l-1}^{l-M} |\overline{h}_n|^2}, \quad (9)$$

where $L_1$ and $L_2$ represent the range of timing ambiguity after the initial coarse timing synchronization. The numerator of $\gamma(\overline{\tau}_1, l)$ is the energy of the lth tap and the denominator of $\gamma(\overline{\tau}_1, l)$ is the average energy of M taps before the lth tap.
3. Vary $\overline{\tau}_1$ from 0 to the tap interval $T_p$ and simultaneously change l from $L_1$ to $L_2$ until $\gamma(\overline{\tau}_1, l)$ is maximized. Let the so-obtained tap index and delay of the first tap be denoted by $\hat{l}$ and $\hat{\tau}_1$, respectively. Then, the TOA is estimated by the delay of the $\hat{l}$th tap when $\overline{\tau}_1 = \hat{\tau}_1$.

FIG. 5 is a flow chart summarizing a method of the TOA estimation method discussed above. As shown in FIG. 5, the initial value of the delay of the first tap is set to $\overline{\tau}_1 = 0$ (step 501). Then, first step 502 of two-step estimation procedure for estimating TOA is carried, which provides a CIR estimate using an LS method. In step 503, the energy ratio $\gamma(\overline{\tau}_1, l)$ is calculated and recorded for $l \in [L_1, L_2]$. The value of $\overline{\tau}_1$ is then increased in predetermined steps over the range of $[0, T_p]$ (step 504), and the channel estimation step 501 and calculation of $\gamma(\overline{\tau}_1, l)$ (step 503) are repeated using the new value of $\overline{\tau}_1$. When $\overline{\tau}_1$ is larger than $T_p$ (step 504), the computation is complete and the delay of the tap that maximizes $\gamma(\overline{\tau}_1, l)$ is used as the TOA estimate.

The above detailed description is provided to illustrate specific embodiments of the present invention and is not intended to be limiting. Numerous modifications and variations within the scope of the present invention are possible. The present invention is set forth in the accompanying claims.

We claim:
1. A method for estimating the time-of-arrival (TOA) of a received signal transmitted over a channel according to a multi-band orthogonal frequency division multiplexing scheme, comprising:
 recovering an impulse response for the channel using a least-square method with regard to a measurement of the received signal; and
 reconstructing the impulse response using taps spaced apart by a tap interval, wherein each tap has a unique tap index and is delayed by a fixed tap delay value, wherein the reconstruction includes:

a) with the fixed tap delay value equaling zero, determining a tap index approximating, a time for a first arriving path of the recovered signal; and
b) refining the approximation by varying the fixed tap delay value between zero and the tap interval to find a determined delay value that substantially minimizes the energy leakage of the first arriving path of the recovered channel, wherein the time-of-arrival (TOA) equals a delay for the determined tap index with the fixed tap delay value equaling the determined delay value, and wherein finding the determined delay value comprises calculating an energy ratio.

2. A method as in claim 1, wherein reconstructing the impulse response comprises using a uniformly spaced discrete time model.

3. A method as in claim 2, wherein the model comprises a predetermined number of multipaths.

4. A method as in claim 1, wherein the energy ratio comprises a ratio between a given tap in the recovered channel impulse response and an average energy of the channel response before the given tap.

5. A method as in claim 4, wherein the given tap corresponds to the first arriving path.

6. A method as in claim 1, wherein the determined delay corresponds to an estimation of first TOA.

7. A method as in claim 6, wherein the measured received signals are pilot signals.

8. A method as in claim 7, wherein the pilot signals are transmitted over multiple frequency bands according to a frequency hopping algorithm.

9. A method as in claim 6, wherein recovering the impulse response for the channel operates in a frequency domain impulse response.

* * * * *